W. F. KOCH.
NUT LOCK.
APPLICATION FILED JULY 30, 1915.
1,201,472.
Patented Oct. 17, 1916.
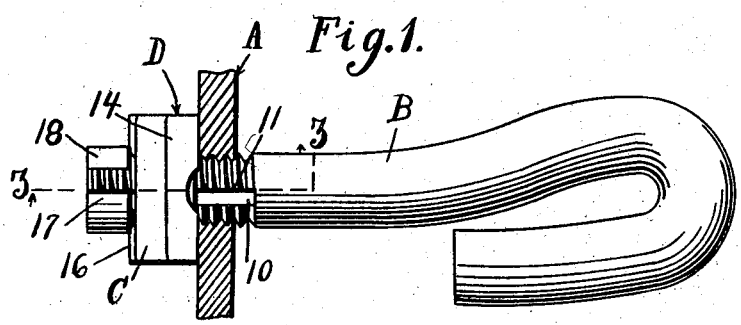
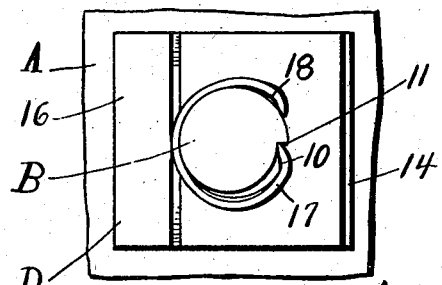
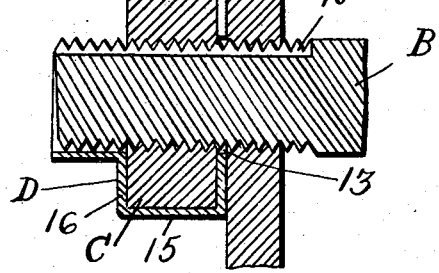
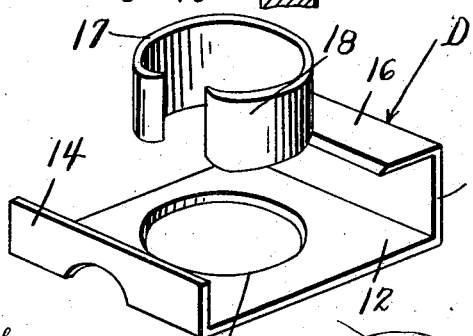
Witnesses
Arthur K. Moore
Henry P. Bright
Inventor
W. F. Koch.
By
Attorneys

UNITED STATES PATENT OFFICE.

WILLIAM F. KOCH, OF HILLSIDE, COLORADO.

NUT-LOCK.

1,201,472.	Specification of Letters Patent.	Patented Oct. 17, 1916.

Application filed July 30, 1915. Serial No. 42,780.

*To all whom it may concern:*

Be it known that I, WILLIAM F. KOCH, a citizen of the United States, residing at Hillside, in the county of Fremont, State of Colorado, have invented certain new and useful Improvements in Nut-Locks; and I do hereby declare the following to be a full, clear, and exact description of the invention, such as will enable others skilled in the art to which it appertains to make and use the same.

This invention relates to nut locks.

The object of the invention is to provide a nut lock which will be exceedingly simple and cheap in construction and which will securely hold the nut in place after it has been screwed home.

With the above and other objects in view the invention consists in the details of construction and in the arrangement and combination of parts to be hereinafter more fully described and particularly pointed out in the appended claim.

In describing the invention in detail reference will be had to the accompanying drawing wherein like characters of reference denote corresponding parts in the several views, and in which—

Figure 1 is a side elevation of the improved nut lock associated with a nut and bolt. Fig. 2 is an end view of what is shown in Fig. 1, Fig. 3, a section on the line 3—3 of Fig. 1, and Fig. 4, a perspective view of the nut lock detached.

Referring to the drawing, A indicates a piece of material through which is arranged a bolt B having a nut C threaded thereon. The threads of the bolt B are interrupted by a longitudinal groove 10, one wall of which being disposed radially with respect to the axis of the bolt, such wall being indicated at 11.

The nut lock comprises a washer indicated generally at D and including a body portion 12 having an opening 13 therein through which the bolt B projects. One end of the washer D extends forwardly as at 14 and overlies one side of the nut C. The other end of the body 12 extends forwardly as at 15 and overlies the side of the nut opposite to that over which the portion 14 extends. The free end of the portion 15 is bent inwardly parallel with the body 12 as at 16 and the free end of this inwardly bent portion 16 terminates in oppositely disposed curved spring arms 17 and 18 adapted to embrace the bolt B. These arms 17 and 18 serve as spring pawls and the arm 17 in a right hand threaded bolt coöperates with the wall 11 to prevent unscrewing of the nut C as will be obvious. In the case of a left hand threaded bolt the position of the wall 11 is reversed and in this instance the free end of the arm 18 coöperates with said wall to prevent unscrewing of the nut C.

What is claimed, is:

A nut lock comprising a washer provided with an opening through which a bolt is adapted to project and having opposite end portions bent to overlie opposite sides of a nut, one of said end portions terminating in oppositely curved arms adapted to embrace a bolt engaged through the washer, the free end of one of said arms being adapted to engage in a suitable notch in the bolt to prevent unscrewing of the nut and the other arm bearing against the bolt opposite the notch whereby said arms form a spring pawl irrespective of their connection to said end portion.

In testimony whereof, I affix my signature, in the presence of two witnesses.

WILLIAM F. KOCH.

Witnesses:
 LOUISA CRESS,
 CLARA M. KENNEY.

Copies of this patent may be obtained for five cents each, by addressing the "Commissioner of Patents, Washington, D. C."